E. R. SCHULZ.
CAR CONSTRUCTION.
APPLICATION FILED MAR. 1, 1916.

1,224,573.

Patented May 1, 1917.

WITNESS
Wm. Geiger

INVENTOR.
Ernest R. Schulz
BY George D. Haight
ATTORNEY

UNITED STATES PATENT OFFICE.

ERNEST R. SCHULZ, OF CHICAGO, ILLINOIS, ASSIGNOR TO WILLIAM H. MINER, OF CHAZY, NEW YORK.

CAR CONSTRUCTION.

1,224,573.   Specification of Letters Patent.   Patented May 1, 1917.

Application filed March 1, 1916.   Serial No. 81,299.

*To all whom it may concern:*

Be it known that I, ERNEST R. SCHULZ, a citizen of the United States, residing at Chicago, in the county of Cook and State of Illinois, have invented a certain new and useful Improvement in Car Construction, of which the following is a full, clear, concise, and exact description, reference being had to the accompanying drawings, forming a part of this specification.

This invention relates to improvements in car construction.

Heretofore, much difficulty has been encountered in providing suitable king pin connections between the bolsters of tank cars due to the fact that the king pin cannot be applied in the usual manner, that is, from the top side of the body bolster, because of the tank being directly supported by the body bolster.

The object of my invention is to provide a center or king pin for attaching the bolsters of tank cars and other cars where access to the top of the body bolster is not feasible, and wherein the king pin is so designed as to tie the two bolsters together and prevent accidental separation thereof.

Figure 1:
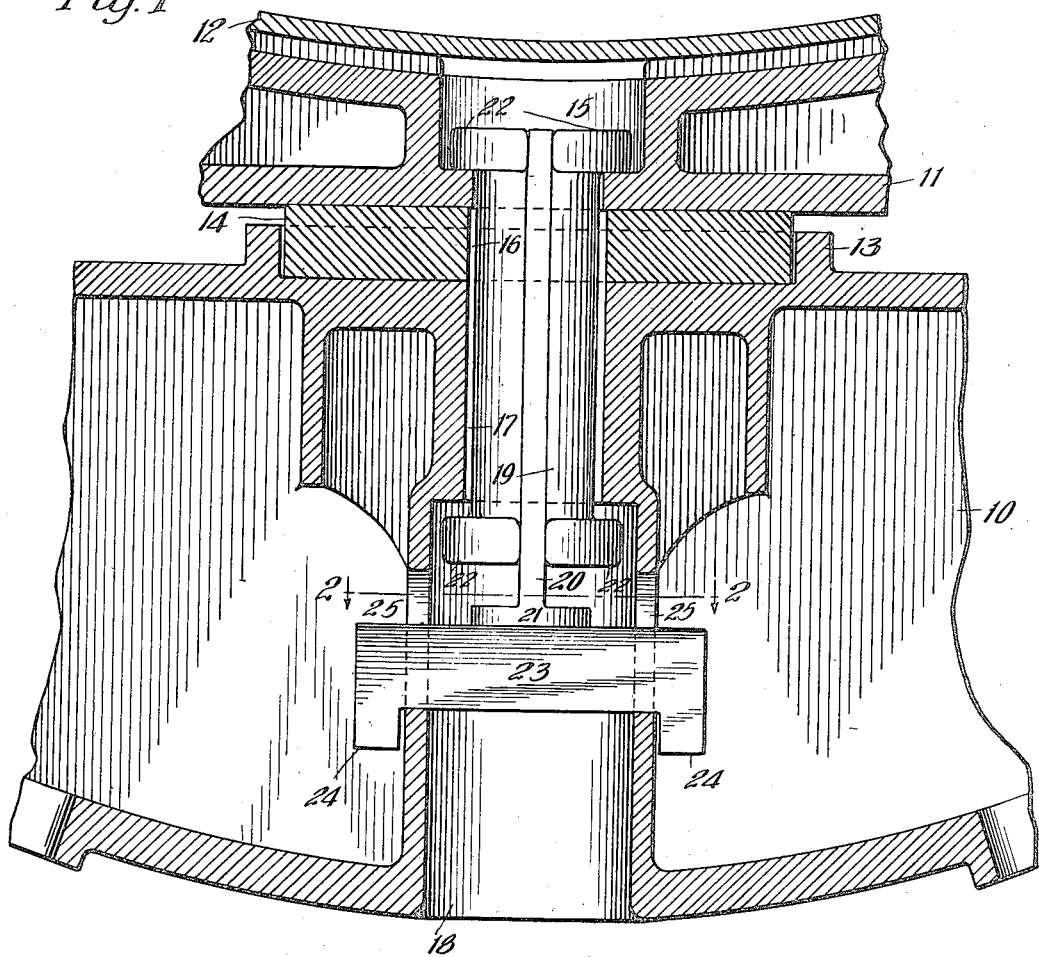
Figure 2:
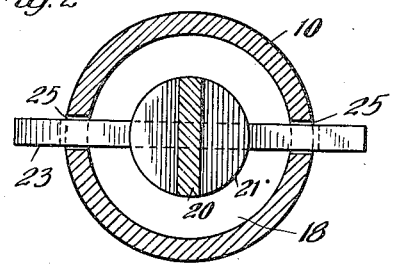
Figure 3:
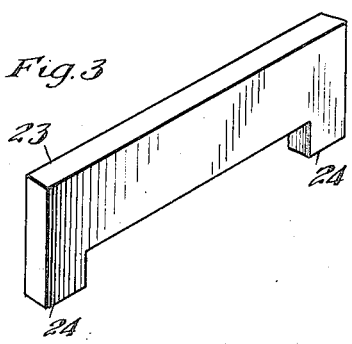

In the drawing forming a part of this specification, Figure 1 is a vertical sectional view taken transversely of a tank car substantially at the centers of the bolsters and illustrating my improvements in connection therewith. Fig. 2 is a horizontal sectional view taken substantially on the line 2—2 of Fig. 1 and Fig. 3 is a detail perspective of one of the members employed.

In said drawing, 10 denotes a truck bolster and 11 the body bolster which is formed to provide a saddle for the tank, the lower portion of which is designated at 12.

The truck bolster is provided with an upstanding annular flange 13 within which is received the center bearing plate 14. The body bolster or saddle casting 11 is provided with a perforation 15, the center plate 14 with a similar perforation 16, and the truck bolster with a corresponding perforation 17, the latter at its lower end being enlarged as indicated at 18.

The improved center pin is of collapsible form and comprises three members, two members 19—19, each of which is segmental in cross section, as shown in Fig. 1, and a third member 20 which is in reality a spreader or key having a headed lower end 21. Each of the members 19 is provided at each end with an arcuate flange 22—22 and the lengths of said members 19—19 are slightly greater than the combined lengths of the perforations 15, 16 and 17.

In assembling the device, the two members 19—19 are first inserted upwardly through the enlarged recess 18 and then through the perforations 17, 16 and 15. Their size is so designed that this may be readily done when the member 20 is not in place. After the members 19 have been elevated to their proper position, the spacer or spreader 20 is then inserted, thus forcing the members 19—19 apart and holding them there, with the flanges 22—22 overlapping the adjacent shoulders of the truck and body bolsters. It is apparent that so long as the spreader is in place, the center pin cannot be removed and the two bolsters are effectively prevented from separating while at the same time permitting the usual radial movements. In order to retain the spreader member 20 in position, I have provided a supporting key or block 23, most clearly shown in Fig. 3. The key 23 is provided with depending shoulders 24—24 at each end. The wall of the truck bolster which defines the enlarged opening 18 is provided with two diametrically arranged vertical slots 25—25 which are slightly longer than the vertical dimension of the ends of the key 20. To apply the key 23, the spreader 20 is lifted as high as possible, whereupon the key 23 has one end thereof inserted through one slot 25 and then the opposite end through the other slot 25. The key 23 will then fall by gravity and rest in the position indicated in Fig. 1, whereupon the spreader 20 will also fall and be supported on the key. On account of the shoulders 24—24, the key 23 cannot work out of place accidentally and the weight of said key and the spreader 20 is more than sufficient to prevent any accidental escape of the key due to falling or other causes.

From the foregoing description, it will be seen that the center or king pin arrangement which I have provided is exceedingly simple, may be readily applied and taken out and permits a tying connection between the bolsters.

I claim.

1. In car construction, the combination with body and truck bolsters perforated to receive a center pin, the perforation in the body bolster being inaccessible from the top of the bolster, of a center pin for pivotally connecting said bolsters, said pin comprising two similar members each having flanged upper and lower ends adapted to overlap adjacent shoulders on the body and truck bolsters, and an intermediate spreader for said members, and a key extending transversely through the truck bolster and upon which said spreader is adapted to rest, all of the parts of said center pin being insertible from the under side of the truck bolster and when in position, being adapted to lock the two bolsters against vertical separation.

2. In car construction, the combination with a truck bolster having a central perforation to receive a center pin, said perforation being accessible from the under side, of a multiple piece king pin all the parts of which are insertible from the underside of said bolster up through said opening, said bolster being provided with slots below the lower end of the king pin when the latter is in position, and a removable key inserted through said slots and adapted to retain one of the king pin members in position.

In witness that I claim the foregoing I have hereunto subscribed my name this 26th day of Feb. 1916.

ERNEST R. SCHULZ.